United States Patent
Kato et al.

(10) Patent No.: US 8,916,070 B2
(45) Date of Patent: Dec. 23, 2014

(54) TIN OXIDE PARTICLES AND METHOD FOR PRODUCING SAME

(75) Inventors: Kazuhiko Kato, Saitama (JP); Kenji Suzuoka, Saitama (JP); Yasunori Tabira, Saitama (JP); Isamu Yashima, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 58 days.

(21) Appl. No.: 13/992,862

(22) PCT Filed: Jan. 10, 2012

(86) PCT No.: PCT/JP2012/050252
§ 371 (c)(1),
(2), (4) Date: Jun. 10, 2013

(87) PCT Pub. No.: WO2012/098948
PCT Pub. Date: Jul. 26, 2012

(65) Prior Publication Data
US 2013/0256607 A1    Oct. 3, 2013

(30) Foreign Application Priority Data

Jan. 19, 2011    (JP) .................................. 2011-008982

(51) Int. Cl.
*H01B 1/08*    (2006.01)
*C01G 19/02*    (2006.01)
*H01B 1/14*    (2006.01)
*H01B 1/20*    (2006.01)

(52) U.S. Cl.
CPC    *H01B 1/08* (2013.01); *C01G 19/02* (2013.01); *H01B 1/14* (2013.01); *H01B 1/20* (2013.01); *C01P 2002/52* (2013.01); *C01P 2002/54* (2013.01); *C01P 2002/82* (2013.01); *C01P 2006/40* (2013.01); *C01P 2004/62* (2013.01); *C01P 2004/64* (2013.01)
USPC ........................................ 252/520.1; 423/618

(58) Field of Classification Search
USPC ........................................ 252/520.1; 423/618
See application file for complete search history.

(56) References Cited

U.S. PATENT DOCUMENTS

| 8,491,822 B2 * | 7/2013 | Kato et al. | ................. 252/520.1 |
| 2013/0344336 A1 * | 12/2013 | Mogi et al. | ..................... 428/402 |
| 2014/0093734 A1 * | 4/2014 | Mogi et al. | ..................... 428/402 |

FOREIGN PATENT DOCUMENTS

| JP | 06-345429 | 12/1994 |
| JP | 2003-300727 | 10/2003 |
| JP | 2004-359477 | 12/2004 |
| JP | 2008-150258 | 7/2008 |
| JP | 2008-222540 | 9/2008 |
| JP | 2010-137183 | 6/2010 |
| JP | 2011-026172 | 2/2011 |
| WO | 2011010631 | 1/2011 |

OTHER PUBLICATIONS

J.D. Donaldson et al., "The structure of the red modification of tin (II) oxide", Acta Crystallographica (1, 948-23,1967).
International Search Report PCT/JP2012/050252 dated Feb. 14, 2012, with English Translation.

* cited by examiner

*Primary Examiner* — Mark Kopec
(74) *Attorney, Agent, or Firm* — Young & Thompson

(57) ABSTRACT

A tin oxide particle having a structure characterized by peaks in Raman spectroscopy at at least $37\pm9$ cm$^{-1}$, $57\pm9$ cm$^{-1}$, $97\pm9$ cm$^{-1}$, $142\pm9$ cm$^{-1}$, $205\pm9$ cm$^{-1}$, $255\pm9$ cm$^{-1}$. The tin oxide particle preferably has an infrared transmittance of 80% or less at a wavelength of 1500 nm. The tin oxide particle preferably exhibits electroconductivity. The tin oxide particle is preferably substantially free from a dopant element that develops electroconductivity.

11 Claims, 1 Drawing Sheet

TIN OXIDE PARTICLES AND METHOD FOR PRODUCING SAME

TECHNICAL FIELD

This invention relates to a novel tin oxide particle and a process for producing the same.

BACKGROUND ART

It is known that a non-electroconductive material, such as plastics, may be made electroconductive by the addition of an electrically conductive powder. Examples of known electroconductive powders include metal powders, carbon black, and tin oxide doped with antimony or a like dopant. Addition of metal powder or carbon black to plastics makes the plastics black, which can limit the utility of the plastics. Addition of tin oxide doped with antimony, etc. makes plastics bluish black, which can also limit the utility of the plastics as with the case of adding carbon black. In addition, using antimony involves the problem of environmental burdens. Hence, various studies have been reported on tin oxide free from a dopant, such as antimony.

Patent literature 1 (see below) describes alkali stabilized tin oxide sol having a particle size of 30 nm or smaller and containing tetramethylammonium hydroxide in an $NH_3$ to $SnO_2$ molar ratio of 0.01 to 0.3. The tin oxide sol is obtained by adding tetramethylammonium hydroxide to an alkaline tin oxide sol having a tin oxide concentration of 15 wt % or less in terms of $SnO_2$, followed by concentration.

Patent literature 2 teaches an alternative process for preparing tin oxide sol comprising adding tin to 0.1 to 8 N hydrochloric acid in an HCl to Sn molar ratio of 0.5 to 1 and then adding thereto a hydrogen peroxide solution. According to the disclosure, the resulting tin oxide particles have an average particle size of 5 to 100 nm.

Patent literature 3 proposes particles, which are not tin oxide particles but a precursor for producing tin oxide particles, having a flaky shape and containing 60 to 88 wt % of Sn and 1 to 15 wt % of organic matter in terms of carbon. The precursor particles disclosed show a sharp peak at about 9° in XRD. According to the disclosure, this peak is attributed to the flaky shape of the particles.

However, the tin oxide particles produced by the above described techniques are not regarded as being sufficient in transparency in the form of film and electroconductivity.

Apart from the above techniques, tin (II) oxide having an orthorhombic crystal structure with lattice constants of a=0.5 nm, b=0.572 nm, and c=0.1112 nm is reported in non-patent literature 1 (see below). A report on the space group of this tin oxide is also found in the same literature. According to the literature, however, the tin oxide is unstable and ready to change to another structure. The literature is silent on the electroconductivity or transparency of the tin oxide.

CITATION LIST

Patent Literature

Patent literature 1: JP 2004-359477A
Patent literature 2: JP 2008-222540A
Patent literature 3: JP 2008-150258A

Non Patent Literature

Non-patent literature 1: Acta Crystallographica, vol. 16, p. 22, 1963

SUMMARY OF INVENTION

Technical Problem

An object of the invention is to provide tin oxide particles free from the drawbacks of the above described conventional techniques and a process for producing such tin oxide particles.

Solution to Problem

The invention provides a tin oxide particle having peaks in Raman spectroscopy at at least $37\pm9$ $cm^{-1}$, $57\pm9$ $cm^{-1}$, $97\pm9$ $cm^{-1}$, $142\pm9$ $cm^{-1}$, $205\pm9$ $cm^{-1}$, $255\pm9$ $cm^{-1}$.

The invention also provides a suitable process for producing the tin oxide particle. The process includes adding a solid water-soluble tin (II) compound into water from which dissolved oxygen has been removed, dissolving the compound in the water to form an aqueous solution, and adding an alkali to the aqueous solution.

Advantageous Effects of Invention

The invention provides tin oxide particles having high electroconductivity and transparency to visible light when formed into film.

DESCRIPTION OF EMBODIMENTS

Figure 1:
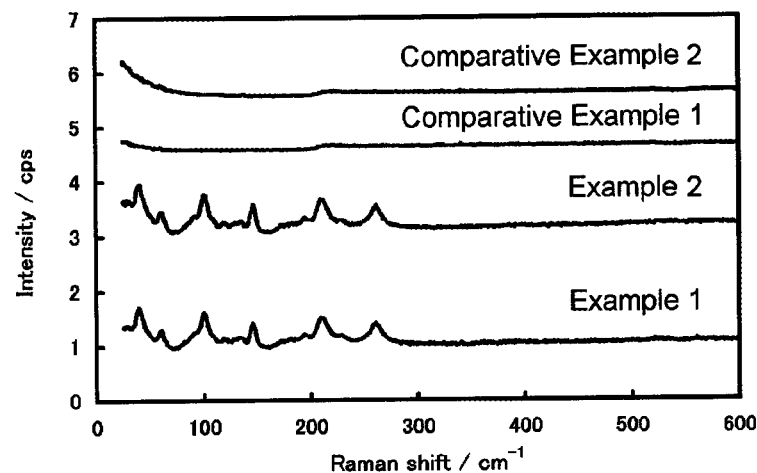
FIG. 1 shows Raman spectra of the tin oxide particles obtained in Examples and Comparative Examples.

The present invention will be described based on its preferred embodiments. The tin oxide particle of the invention is electroconductive and has a structure characterized by peaks in a small wave-number region in Raman spectroscopy, specifically at at least $37\pm9$ $cm^{-1}$, $57\pm9$ $cm^{-1}$, $97\pm9$ $cm^{-1}$, $142\pm9$ $cm^{-1}$, $205\pm9$ $cm^{-1}$, $255\pm9$ $cm^{-1}$. In other words, the tin oxide particle of the invention exhibits Raman activity. Tin oxide species so far known, such as $SnO_2$ and SnO, do not show peaks at the wave-numbers recited above in their Raman spectra. That is, the tin oxide particle having peaks in such wave-number in Raman spectroscopy has never been unknown, and the tin oxide particle of the invention is completely novel. The tin oxide particle of the invention shows one or more weak peaks in addition to the spectral peaks of Raman scattered light depending on the Raman spectroscopy conditions. The procedures of Raman spectroscopy will be described in Examples hereinafter given.

The tin oxide particle of the invention showing Raman shift peaks at the recited wave-numbers exhibits higher electroconductivity than a tin oxide particle that does not show the peaks. As a result of the inventors' study, it has been revealed that such Raman activity of the tin oxide particle of the invention disappears on heat-treating the tin oxide particle. A tin oxide particle having thus lost the Raman activity does not exhibit high electroconductivity any more but exhibits high resistivity. The inventors consider from this that the electroconductivity of the tin oxide particle of the invention is attributed to lattice oscillation developing electroconductivity. The aforementioned heat treatment is carried out, for example, at 450° C. or higher for 2 hours or longer in the atmosphere.

The increased electroconductivity of conventionally known electroconductive tin oxide is generally obtained by doping tetravalent tin with a dopant element, such as antimony, niobium, or tantalum. In contrast, the increased electroconductivity of the tin oxide according to the invention owes to control of the lattice oscillation in tin oxide. This technique of the invention allows for increasing the electroconductivity of tin oxide particles while overcoming the drawbacks of using a dopant element, such as economical disadvantage and large environmental burden. Tin oxide having only divalent tin is, while electroconductive, black-colored and therefore unable to be used in applications requiring transparency, such as a transparent electroconductive film. Tin oxide having only tetravalent tin is unable to have increased electroconductivity over that of tin oxide having only divalent tin. In contrast, the tin oxide particles of the invention have a whitish color, which allows application to a transparent electroconductive film, and exhibit high electroconductivity, which makes it feasible to provide a transparent electroconductive film with increased electroconductivity. The valence of tin in the tin oxide particle of the invention has not yet been elucidated as far as the inventors have analyzed.

It is preferred for the tin oxide particle of the invention to contain only tin as a metal element and only oxygen (in some cases oxygen and hydrogen) as other elements and to be substantially free from a dopant element, namely, of non-doped type. For tin oxide particles to be non-doped is advantageous in that highly electroconductive tin oxide particles are obtained without using various dopant elements that are expensive and economically noncompetitive or impose great environmental burdens. When the tin oxide particles are of non-doped type, their chemical analysis values are: Sn, 70 to 90 wt %, and 0, 10 to 30 wt %, with, in some cases, a trace amount of other elements, such as H.

Examples of dopant elements include those conventionally used in the art to impart electroconductivity to tin oxide, such as V, Nb, Ta, Cr, Mo, W, P, As, Sb, Bi, F, Cl, Br, and I. By the term "substantially free from" as used herein is meant that intentional addition of a dopant element is excluded. Unavoidable incorporation of a trace amount of a dopant element during the production process of the tin oxide particles is therefore allowable.

As stated, the tin oxide particle of the invention is preferably free from a dopant element. Nevertheless, a dopant element may be present in some specific applications. In the cases where the tin oxide particle contains a dopant element, the content of the dopant element is preferably 0.01 to 20 mol %, more preferably 0.05 to 15 mol %, relative to the total tin from the viewpoint of enhancing the electroconductivity without impairing cost economy. The dopant elements that may be used in such cases include one or more of the above recited elements.

The tin oxide particles of the invention preferably have an average primary particle size of 1 to 5000 nm, more preferably 3 to 3000 nm, even more preferably 3 to 1000 nm, as observed using a scanning electron microscope (SEM).

The tin oxide particles of the invention exhibit high transparency when formed into film. For example, a film having a thickness of 2 to 3 μm and containing the tin oxide particles in an amount of 30% to 80% exhibits very high transparency as having a total transmittance of 85% or more, preferably 90% or more, in the visible light region. The tin oxide particles of the invention have low transparency to infrared light. For example, a film having a thickness of 2 to 3 μm and containing the tin oxide particles in an amount of 30% to 80% exhibits high infrared shielding properties as preferably having an infrared transmittance of 80% or less, more preferably 70% or less, at a wavelength of 1500 nm and of 50% or less, more preferably 30% or less, at 2000 nm. Film formation and measurement of total transmittance and infrared transmittance will be described in Examples.

The tin oxide particle of the invention is also characterized by high electroconductivity, which is specifically represented by such low resistance as a powder resistivity of $10^5$ Ω·cm or less, preferably $10^4$ Ω·cm or less, more preferably $10^3$ Ω·cm or less, under a 500 kgf load. The method of measuring powder resistivity will be described later.

A preferred process for producing the tin oxide particle of the invention will then be described. In the process, a water soluble compound of divalent tin (tin (II)) is used as a starting material. The water soluble tin (II) compound is added in the form of solid to water having been freed from dissolved oxygen to form an aqueous solution. Then, an alkali is added to the aqueous solution. Each step of the process is described below in detail.

A water soluble tin (II) compound is provided as a starting material. Such a water soluble compound is exemplified by tin (II) dichloride. Although using tin (IV) as a starting material is conceivable, the inventors' investigations have revealed that tin (II) is readier to provide a desired oxide than tin (IV). Accordingly, tin (II) is used as a starting material in the process of the invention.

Separately from the water-soluble tin (II) compound, water from which dissolved oxygen has been removed is provided. Any technique known in the chemical engineering art may be used to remove dissolved oxygen. For example, water may be freed from dissolved oxygen by bubbling with an inert gas, such as nitrogen gas. No matter what technique is used to remove dissolved oxygen from water, it is preferred to reduce the dissolved oxygen concentration to 10 ppm or less so as to obtain desired tin oxide particles successfully.

The purpose of removing dissolved oxygen from water is to avoid dissolved oxygen causing oxidation and hydrolysis of tin (II). For example, in using tin (II) chloride as a water soluble tin (II) compound, if water contains dissolved oxygen, oxidation and hydrolysis can occur to produce water insoluble tin compounds, i.e., an oxide, an oxychloride, an oxyhydroxide, or a chlorohydroxide.

Oxidation and hydrolysis of tin (II) could be prevented by previously rendering water acidic by the addition of a mineral acid, e.g., hydrochloric acid, instead of dissolved oxygen removal. However, the inventors' study has proved that in that case desired tin oxide particles cannot be obtained successfully.

The reason for adding the water soluble tin (II) compound to water in the form of solid is also to minimize hydrolysis of tin (II). The amount of the water soluble tin (II) compound is preferably such that the final tin (II) ion concentration of the resulting aqueous solution ranges from 0.01 to 3 mol/L, more preferably 0.05 to 1.5 mol/L.

As a result of the inventor's study, it has been proved advantageous to add an organic compound having a hydroxyl group to water prior to the addition of the solid water-soluble tin (II) compound. By the addition of the solid water soluble tin (II) compound to water containing the hydroxyl-containing organic compound, the tin (II) ion concentration of the aqueous solution and the amount of alkali to be added (hereinafter described) can be selected from a wider range. That is, there is provided a higher degree of freedom of deciding the amounts of the water soluble tin (II) compound and the alkali to be added.

The hydroxyl-containing organic compound may be a low molecular compound or a high molecular compound. Examples of a low molecular, hydroxyl-containing organic compound include monohydric alcohols that may be aliphatic, alicyclic, or aromatic. Examples of aliphatic monohydric alcohols include those having 1 to 6 carbon atoms, such as methanol, ethanol, n-butanol, and n-hexanol. Examples of alicyclic monohydric alcohols are cyclohexanol and terpineol. Examples of aromatic monohydric alcohols include benzyl alcohol.

The high molecular, hydroxyl-containing organic compound is exemplified by polyvinyl alcohols and polyols. The polyvinyl alcohols may be unmodified polyvinyl alcohol per se or modified polyvinyl alcohols. The polyvinyl alcohol may be either completely saponified or partially saponified (degree of saponification=80% to 90%). Examples of modified polyvinyl alcohols include carboxyl-modified, alkyl-modified, acetoacetyl-modified, acrylic acid-modified, methacrylic acid-modified, pyrrolidone-modified, vinylidene-modified, and silanol-modified polyvinyl alcohols. It is preferred to use a polyvinyl alcohol $(-CH(OH)CH_2-)_n$ having an average degree of polymerization (n) of 200 to 30000, more preferably 500 to 10000. The degree of polymerization can be measured by size exclusion chromatography (SEC). Examples of the polyols include ethylene glycol, diethylene glycol, triethylene glycol, polyethylene glycol, polypropylene glycol, propanediol, butanediol, pentanediol, hexanediol, glycerol, hexanetriol, butanetriol, and 3-methyl-pentane-1,3,5-triol. Cellosolves, such as methoxyethanol, ethoxyethanol, propoxyethanol, and buthoxyethanol; and carbitols, such as methoxymethoxyethanol, ethoxyethoxyethanol, propoxyethoxyethanol, and butoxyethoxyethanol, are also useful.

In using a monohydric alcohol as the organic compound, the concentration of the hydroxyl-containing organic compound in water preferably ranges from 0.005% to 30%, more preferably from 0.01% to 10%, by weight. Within that range, the effects of the hydroxyl-containing organic compound are fully achieved; inconveniences such as thickening hardly occur; and desired tin oxide particles having a uniform particle size are successfully obtained. For the same reasons, in using a high molecular hydroxyl-containing organic compound, the concentration of the organic compound is preferably 0.005% to 10%, more preferably 0.01 to 5%, by weight.

The ratio of tin (II) to hydroxyl-containing organic compound in water in terms of Sn to OH molar ratio is preferably 0.01 to 150, more preferably 0.03 to 75. Within that range, unreacted Sn ions are less likely to remain in water, and $SnO_2$ and tin (II) oxyhydroxide $[Sn_3O_2(OH)_2]$, which are by-products, hardly precipitate.

Immediately after a water soluble tin (II) compound is added in the form of solid to water free from dissolved oxygen or water containing a hydroxyl-containing organic compound and free from dissolved oxygen and dissolved therein, an alkali (basic substance) is added thereto. While the water soluble tin (II) compound is being dissolved, it is preferred to continue bubbling the system with an inert gas in order to minimize hydrolysis of tin (II).

Tin (II) is neutralized by the addition of an alkali. Examples of the alkali include alkali metal hydroxides, such as sodium hydroxide and potassium hydroxide; alkaline earth metal hydroxides, such as magnesium hydroxide; carbonates, such as $NaHCO_3$ and $NH_4HCO_3$; and ammonia. It is convenient to add the alkali in the form of an aqueous solution. The pH of the aqueous alkali solution to be added is preferably such that the mixed aqueous solution after the alkali addition may have a pH of 2 to 9, more preferably 2.5 to 7. When the pH of the mixed aqueous solution is in that range, desired tin oxide particles are obtained in a single phase.

In order to achieve successful neutralization of tin (II) to give desired tin oxide particles, it is preferred that the water to which the alkali has been added be heated in an open or closed system. Specifically, the water to which the alkali has been added is preferably maintained at 40° to 105° C., more preferably 60° to 100° C.

It is preferred that the addition of the aqueous alkali solution be slow, taking a predetermined time. When the aqueous alkali solution is added all at once, care should be taken because such way of addition may fail to produce desired tin oxide particles. When the aqueous alkali solution is added slowly, it is recommended to adjust the rate of addition so that the pH of the mixed aqueous solution may be kept within the range recited above.

Desired tin oxide particles thus form in the liquid. There can be tin oxyhydroxide as a by-product in the liquid. It is therefore desirable to add hydrogen peroxide to the liquid for the purpose of removing the by-product. Addition of hydrogen peroxide accelerates oxidation of tin oxyhydroxide to produce tin dioxide. Because tin dioxide is produced in the form of fine particles, it is separated by water elutriation making use of the difference in settling velocity of particles. In water elutriation, the desired tin oxide particles are sediment, while $SnO_2$ to be removed is in the supernatant. Because $SnO_2$ is dispersible under an alkaline condition, classification efficiency by water elutriation may be increased by adjusting the pH of the liquid to 8 to less than 11 with, e.g., $NH_4OH$ and then highly dispersing $SnO_2$ by the use of a high-speed agitator or by ultrasonic irradiation prior to the water elutriation. To control the oxidation of the tin oxyhydroxide, hydrogen peroxide is preferably added in the form of a dilute aqueous solution having a predetermined concentration. From this viewpoint, the dilute hydrogen peroxide solution preferably has a concentration of about 1% to 15% by weight.

The thus collected tin oxide particles may easily be freed of impurities by, for example, repulping with water. To sufficiently remove impurities, repulping with water is preferably performed until the electroconductivity of the dispersing medium (water) reduced to 2000 μS or less, more preferably 1000 μS or less.

A dispersion of the tin oxide particles having been purified by repulping until the dispersing medium has a prescribed reduced electroconductivity is then subjected to a disagglomeration operation to provide tin oxide sol. The disagglomeration operation may be implemented by the use of, for example, a media mill, e.g., a bead mill. It is preferred to carry out the disagglomeration operation in the presence of a pH adjustor of various kinds so that tin oxide particles close to monodisperse may be obtained. A pH adjustor may be added after the disagglomeration. A pH adjustor capable of adjusting the pH of the dispersion to 3 to 10, preferably 3 to 6, is preferably used. Examples of such a pH adjustor include acids, such as inorganic acids (e.g., hydrochloric acid, sulfuric acid, and nitric acid) and carboxylic acids (e.g., acetic acid and propionic acid), and alkalis, such as aqueous ammonia and organic amines (e.g., ethanolamine).

As a result of the disagglomeration operation, tin oxide sol having water as a dispersing medium is obtained. The tin oxide sol thus obtained is a transparent dispersion having high storage stability. The tin oxide sol preferably contains the tin oxide particle in a concentration of 0.1% to 50%, more preferably 1% to 40%, by weight. In the tin oxide sol the tin oxide particles are highly dispersed.

The above described process, in which tin oxide is produced in a liquid phase (water), easily produces tin oxide sol with high dispersibility and low agglomeration as compared with the conventional processes in which tin oxide obtained by firing is pulverized and then slurried into sol.

The tin oxide particles of the invention may be dispersed in an organic solvent to prepare a transparent monodisperse dispersion. The dispersing may be carried out using, for example, a bead mill or a paint shaker. Useful organic solvents include polyhydric alcohols, monohydric alcohols, cellosolves, carbitols, ketones, and mixtures thereof. The concentration of the tin oxide particles in the transparent dispersion is preferably 0.1% to 50%, more preferably 1% to 40%, by weight. The transparent dispersion has high storage stability. The transparent dispersion may serve as, for example, an ink material by addition of a binder.

Examples of the polyhydric alcohols are ethylene glycol, diethylene glycol, triethylene glycol, polyethylene glycol, polypropylene glycol, propanediol, butanediol, pentanediol, hexanediol, glycerol, hexanetriol, butanetriol, 3-methyl-pentane-1,3,5-triol, and glycerol. Examples of the monohydric alcohols are methanol, ethanol, propanol, pentanol, hexanol, octanol, nonanol, decanol, terpineol, benzyl alcohol, and cyclohexanol. Examples of the cello solves are methoxyethanol, ethoxyethanol, propoxyethanol, and butoxyethanol. Examples of the carbitols include methoxyethoxyethanol, ethoxyethoxyethanol, propoxyethoxyethanol, and butoxyethoxyethanol. Examples of the ketones include acetone, methyl ethyl ketone, diethyl ketone, methyl isobutyl ketone, and diacetone alcohol.

The tin oxide particles thus obtained are useful in broad applications with their high electroconductivity being taken advantage of. The applications include charging rollers, photoreceptor drums, toners, electrostatic brushes, and the like of printers or copiers; flat panel displays, CRTs, Braun tubes, and the like; coatings, inks, emulsions, and the like. The tin oxide particles are also useful as an infrared shielding material, with the high reflectance to infrared light being taken advantage of

EXAMPLES

The invention will now be illustrated in greater detail with reference to Examples, but it should be understood that the invention is not construed as being limited thereto. Unless otherwise noted, all the percents are by weight.

Example 1

In 490 g of pure water was dissolved 3.98 g of sodium hydroxide to prepare an aqueous alkali solution for neutralization (designated solution A).

Separately, 490 g of pure water was put in a beaker, and a 1 mm diameter Pyrex® glass tube was stuck into the water, through which 100 ml/min of nitrogen gas was fed to bubble the water to remove dissolved oxygen. To the bubbled pure water, the dissolved oxygen concentration of which was found to be 3 ppm, was added 0.5 g of completely saponified polyvinyl alcohol (average degree of polymerization n=400 to 600, hereinafter abbreviated as PVA) and dissolved by heating to 85° C. to prepare an aqueous PVA solution (designated solution B).

Then, 12.58 g of solid anhydrous tin dichloride was dissolved in the solution B bubbled and heated to 85° C. to prepare an aqueous tin solution (designated solution C). Immediately thereafter, the whole amount of the solution A was slowly fed thereto to prepare a mother solution while continuing bubbling and maintaining the temperature of the solution at 85° C. The pH of the mother solution was 2 to 3.

After the addition of the solution A, bubbling was stopped, and the system was aged for 5 minutes. A dilute hydrogen peroxide aqueous solution prepared by diluting 7.5 g of 30% hydrogen peroxide solution with 30 g of pure water was fed to the mother solution at a rate of 5 ml/min, followed by aging for 5 minutes, to produce tin oxide particles.

Figure 2:
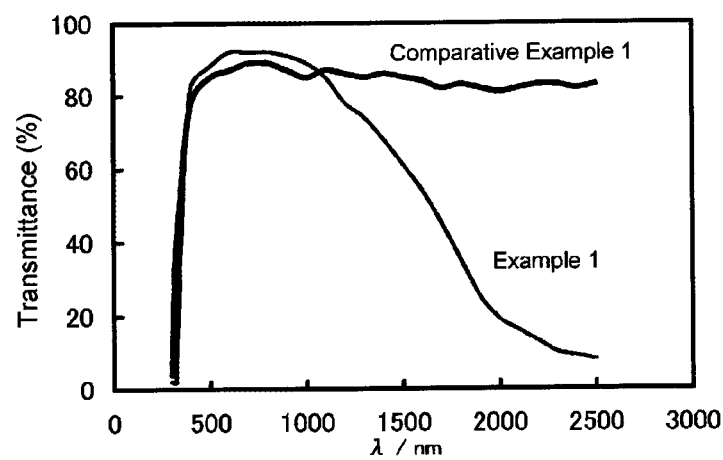
FIG. 2 shows a graph of transmittance of the tin oxide particles obtained in Example 1 and Comparative Example 1 in a wavelength range of from visible to infrared light.

The resulting slurry containing the particles was filtered through filter paper (Advantec 5C). The filter cake was washed by pouring 1 L pure water. The resulting cake was repulped in 1 L pure water, filtered, and washed by pouring water again. These operations were repeated three times. The thus washed cake was dried in the atmosphere in a hot air drier set at 120° C. for 10 hours. The resulting powder was characterized in terms of Raman spectrum, powder resistivity, total visible light transmission, infrared transmission at 1500 nm, average primary particle size, and chemical composition in accordance with the methods below. The results of Raman spectroscopy are shown in FIG. 1. The results of measurement of transmission in the wavelength range of from visible to infrared light in Example 1 and Comparative Example 1 are shown in FIG. 2. The results of measurement of powder resistivity, total visible light transmittance, the infrared transmittance at 1500 nm, the average primary particle size, and the chemical composition are shown in Table 1 below.

(1) Raman Spectroscopy

Raman spectroscopy was performed using a laser Raman spectrometer NRS-2100 from JASCO Corp. by microscopic analysis. Light from an He—Ne laser ($\lambda$=632.8 nm) was used as exciting light. The Raman spectrum was collected at 4.81 $cm^{-1}$ resolution in a range of from 25 to 600 $cm^{-1}$. The sample was prepared by filling a 10 diameter mold with 0.2 g of the powder and pressing at 1 ton/$cm^2$ to make a pellet.

(2) Powder Resistivity

The powder was compressed under a pressure of 500 kgf/$cm^2$ to make a sample. The resistivity of the sample was measured by the four-prove resistance method using Lorest PAPD-41 from Mitsubishi Chemical Corp.

(3) Total Visible Light Transmittance

The tin oxide particles weighing 7.4 g and 6.4 g of a commercially available acrylic resin were added to 10 g of a toluene/butanol (=7:3 by weight) mixed solvent and dispersed therein with beads in a paint shaker. The resulting dispersion was applied to a PET film and air dried for 1 hour to form a transparent film, the thickness of which was found to be 2 μm as observed using an electron microscope. The total transmittance of the film was determined using a transmission measuring instrument NDH-1001DP from Nippon Denshoku Industries Co., Ltd.

(4) Infrared Transmittance at 1500 nm

The infrared transmittance of the film prepared in the same manner as described in (3) above was measured using a spectrophotometer U-4000 from Hitachi High-Technologies Corp.

(5) Average Primary Particle Size

Twenty tin oxide particles were observed under an SEM to measure the length. An average of the measured lengths was taken as an average primary particle size.

(6) Chemical Analysis

The tin content was determined using ICP, SPS-3000, from SII NanoTechnology Inc. The oxygen content was determined using a gas analyzer EMGA-620, from Horiba, Ltd. The content of carbon as an impurity element was determined using a gas analyzer EMIA-920V, from Horiba, Ltd. The content of chlorine, which was also an impurity element, was determined by absorption spectroscopy (turbidimetry using silver nitrate) (cf. Applied Inorganic Colorimetry Editorial Committee, Muki Oyo Hishoku Bunseki-2, Kyoritsu Publ.).

Example 2

Tin oxide particles were obtained in the same manner as in Example 1, except that PVA was not added but, instead, the aqueous alkali solution for neutralization (solution A) was prepared by dissolved 2.66 g of sodium hydroxide in 490 g of pure water. The resulting tin oxide particles were analyzed in the same manner as in Example 1.

Comparative Example 1

The tin oxide particles obtained in Example 1 were fired in the atmosphere at 450° C. for 3 hours. The resulting tin oxide particles were analyzed in the same manner as in Example 1.

Comparative Example 2

Tin oxide particles (reagent) available from Kojundo Chemical Lab. Co., Ltd. were analyzed in the same manner as in Example 1.

TABLE 1

| | Powder Resistivity ($\Omega \cdot$ cm) | Visible Light Total Transmittance (%) | IR Transmittance (%) | Average Primary Particle Size (nm) | Chemical Analysis (mass %) | | | |
|---|---|---|---|---|---|---|---|---|
| | | | | | Sn | O | C | Cl |
| Example 1 | $8 \times 10^2$ | 90 | 61 | 350 | 77.5 | 18 | 0.7 | 3.0 |
| Example 2 | $1 \times 10^3$ | 90 | 71 | 280 | 78.0 | 18 | 0.1 | 3.3 |
| Compara. Example 1 | $3 \times 10^4$ | 88 | 85 | 100 | 78.5 | 18 | 0.1 | 1.0 |
| Compara. Example 2 | $2 \times 10^5$ | 91 | 95 | 2400 | $SnO_2$ purity: ≥99.9% | | | |

As is apparent from the results shown in FIG. 1, the tin oxide particles obtained in each Example show Raman shift peaks in a specific wave-number range. In contrast, the tin oxide particles obtained in Comparative Examples do not show such peaks. It is especially noteworthy that the tin oxide particles obtained in Example 1 lose the Raman activity on being heat treated as is clearly demonstrated by the comparison between Example 1 and Comparative Example 1.

As is apparent from the results in Table 1 and FIG. 2, it is also proved that the tin oxide particles obtained in each Example exhibit high electroconductivity, high visible light transmission, and high IR shielding properties.

The invention claimed is:

1. A tin oxide particle having a structure characterized by peaks in Raman spectroscopy at at least 37±9 cm$^{-1}$, 57±9 cm$^{-1}$, 97±9 cm$^{-1}$, 142±9 cm$^{-1}$, 205±9 cm$^{-1}$, 255±9 cm$^{-1}$.

2. The tin oxide particle according to claim 1, having an infrared transmittance of 80% or less at a wavelength of 1500 nm.

3. The tin oxide particle according to claim 2, having electroconductivity.

4. The tin oxide particle according to claim 1, having electroconductivity.

5. The tin oxide particle according to claim 4, being substantially free from a dopant element developing electroconductivity.

6. A transparent dispersion comprising a solvent of water or an organic solvent, and the tin oxide particle according to claim 1 dispersed in the solvent.

7. A process for producing the tin oxide particle according to claim 1, comprising adding a solid water-soluble tin (II) compound into water from which dissolved oxygen has been removed, dissolving the compound in the water to form an aqueous solution, and adding an alkali to the aqueous solution.

8. The process according to claim 7, wherein dissolved oxygen is removed from water by bubbling with an inert gas.

9. The process according to claim 8, wherein the water contains an organic compound having a hydroxyl group.

10. The process according to claim 7, wherein the water contains an organic compound having a hydroxyl group.

11. The process according to claim 10, wherein the organic compound having a hydroxyl group is a polyvinyl alcohol, a polyol, or a monohydric lower alcohol.

* * * * *